United States Patent [19]
Redenbarger et al.

[11] Patent Number: 4,887,696
[45] Date of Patent: Dec. 19, 1989

[54] DISC BRAKE

[75] Inventors: Philip D. Redenbarger, Centerpoint, Ind.; George W. Megginson, Thomasville, Ala.

[73] Assignee: The B. F. Goodrich Company, Akron, Ohio

[21] Appl. No.: 277,729

[22] Filed: Nov. 30, 1988

[51] Int. Cl.[4] ............... F16D 55/02; F16D 55/22; F16D 65/14; F16D 65/54
[52] U.S. Cl. .................. 188/73.45; 188/71.8; 188/72.3; 188/73.34; 188/196 P; 188/216
[58] Field of Search ............. 188/73.45, 73.44, 71.8, 188/72.3, 196 P, 73.32, 73.33, 73.34, 73.43, 216

[56] References Cited

U.S. PATENT DOCUMENTS

| Re. 30,255 | 4/1980 | Rath et al. | 188/73.45 |
|---|---|---|---|
| 3,375,906 | 4/1968 | Hayes | 188/73.45 |
| 3,688,876 | 9/1972 | Hirai et al. | 188/73.45 |
| 3,734,248 | 5/1973 | Fay | 185/73.45 X |
| 3,805,925 | 4/1974 | Schoenhenz | 188/73.45 |
| 3,860,095 | 1/1975 | Morris | 188/71.8 |
| 4,074,795 | 2/1978 | Kondo et al. | 188/73.45 X |
| 4,106,595 | 8/1978 | Kimura et al. | 188/73.45 |
| 4,109,766 | 8/1978 | Inoue et al. | 188/73.45 X |
| 4,144,952 | 3/1979 | Nakayama | 188/73.45 |
| 4,193,481 | 3/1980 | Wunderlich | 188/71.8 |
| 4,222,463 | 9/1980 | Domes et al. | 188/72.3 |
| 4,311,219 | 1/1982 | Watanabe et al. | 188/71.8 |
| 4,372,428 | 2/1983 | Delaunay et al. | 188/73.34 X |
| 4,424,886 | 1/1984 | Frigger et al. | 188/73.45 X |
| 4,436,186 | 3/1984 | Ritsema et al. | 188/71.8 |
| 4,446,947 | 5/1984 | Le Deit | 188/73.45 X |
| 4,446,948 | 5/1984 | Melinat | 188/73.45 |
| 4,458,790 | 7/1984 | Hoffman, Jr. et al. | 188/71.8 |
| 4,465,163 | 8/1984 | Matsumoto | 188/73.45 X |
| 4,488,622 | 12/1984 | Stoka . | |
| 4,494,630 | 1/1985 | Stoka et al. | 188/71.8 |
| 4,537,288 | 8/1985 | Stoka | 188/196 P X |
| 4,685,542 | 8/1987 | Colpaert . | |
| 4,807,725 | 2/1989 | Weiler et al. | 188/196 P X |
| 4,823,920 | 4/1989 | Evans | 188/73.34 |

Primary Examiner—Douglas C. Butler
Attorney, Agent, or Firm—Joseph Januszkiewicz

[57] ABSTRACT

A disc brake assembly comprises a caliper member that is rectilinearly movable relative to a support member via a pin member that slidably guides the caliper member while secured to the support member. A second pin member is secured to and movable with the caliper member while interconnected to the support member via a deformable elastomeric ring that aids in the return of the caliper member and the friction elements connected thereto upon termination of a braking operation.

11 Claims, 3 Drawing Sheets

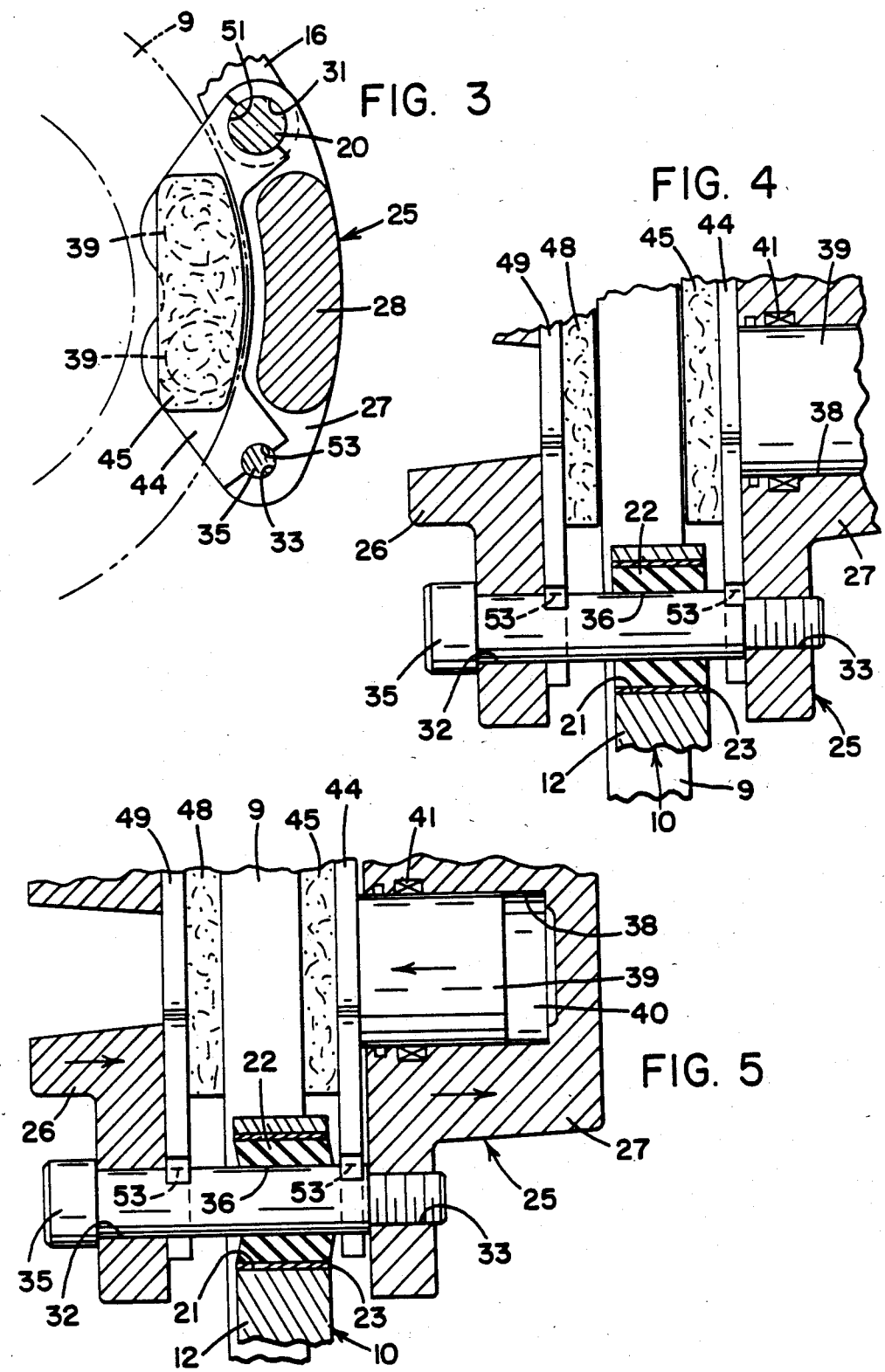

4,887,696

DISC BRAKE

BACKGROUND OF THE INVENTION

This invention relates to a caliper brake and more particularly to a new and improved pin mounted sliding caliper brake.

In off-highway disc brakes there may be employed a sliding caliper with pistons only on one side of the disc or a pair of opposed pistons wherein each opposed piston controls the application of the braking forces and with the corresponding result that the braking forces are transferred to the caliper housing that supports the opposed pistons. Such caliper housing is mounted rigidly such that the operational deflections are absorbed by the moveable pistons on each side of the caliper. In this type of construction, additional stops and pins or rail mechanisms must be employed to transfer the braking forces from the brake linings to the caliper. In lieu of this construction a sliding caliper arrangement is used to lower the cost of machining for the dual piston structure where twice as many pistons are necessary to machine as well as service. The latter arrangement also requires a smaller envelope and is particularly useful where there is a space limitation because of the dual opposing piston arrangement. The sliding caliper construction is lighter in weight requiring less machining and eliminates the extra bleeding of the chambers for the dual pistons.

The present invention is directed to a pin mounted sliding caliper type brake structure wherein the caliper is mounted on a round pin which guides the sliding caliper from side to side. Such construction allows the torque loading to be transferred to the vehicle chassis through the round pin mounting. An elastomeric rail snubber which is axially deformable is used to assist in the retracting of the brake pistons on release of the braking operation. Such elastomeric snubber also permits adjusting for wear of the brake lining. The structure of the instant invention permits easy access to the internal structure and permits complete access to the linings for their service and replacement in a facile manner.

SUMMARY OF THE INVENTION

A disc brake assembly that has a stationary support member with a portion thereof mounted adjacent to a rotor. A caliper member with friction elements mounted on opposite sides of the rotor is mounted on a pair of pin members that are parallel to the axis of the rotor. One pin member is secured to the support member while slidably connected to the caliper member. The second pin member is secured via the outside diameter of a deformable ring member to the support member and frictionally held by the inside diameter surface of the deformable ring, which deformable ring helps to restore the caliper member and its frictional elements to their normal condition upon termination of a braking operation.

BRIEF DESCRIPTION OF THE DRAWINGS

FIG. 3 is a cross sectional view of the brake taken on line 3—3 of FIG. 2;

FIG. 4 is a further enlarged cross sectional view of a lower portion of the brake disc assembly illustrating pin members connection to the caliper member and to an elastomeric deformable ring;

FIG. 5 is a cross sectional view of a lower portion of the brake disc assembly similar to FIG. 4 but with a brake application illustration the deformable ring interconnecting the pin member to a portion of a stationary support member.

DESCRIPTION OF THE PREFERRED EMBODIMENT

Figure 1:
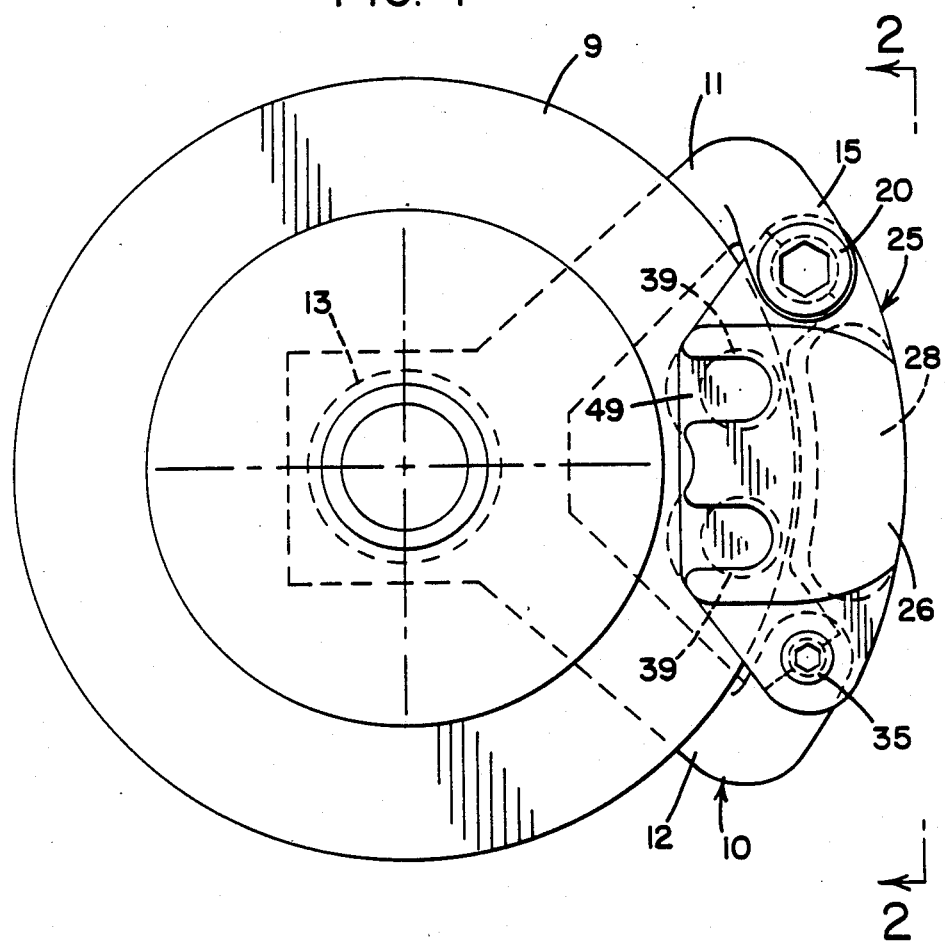
FIG. 1 is a side elevational view of a disc brake assembly and rotor disc.
Figure 2:
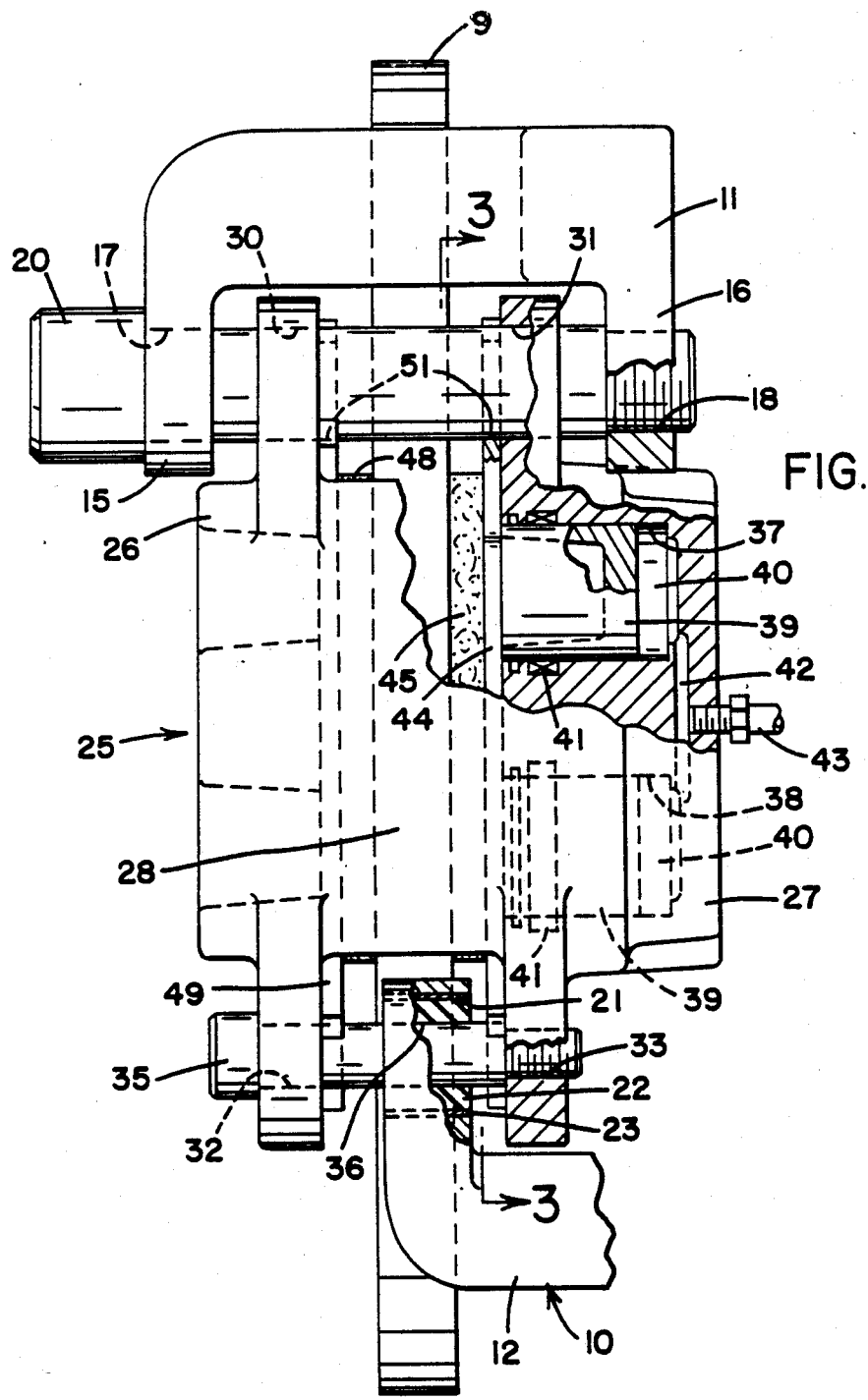
FIG. 2 is an enlarged front elevational view of a brake disc assembly and rotor disc taken on line 2—2 of FIG. 1 with portions broken away.

Referring now to the drawings wherein like reference numerals designate like or corresponding parts throughout the several views, there is shown in FIGS. 1 and 2 a rotatable brake disc 9 and a Y shaped brake support 10 with diverging leg members 11 and 12 suitably mounted onto the axle housing 13 or other stationary fixed member of the chassis.

The one end of leg member 11 is bifurcated as at 15 and 16 with an enlarged bore 17 and a threaded bore 18 respectively. A capped guide bolt or pin shoulder member 20 extends through bore 17 and is threadedly connected to threaded bore 18. The one end of leg members 12, which is a single member has a bore 21 and receives an elastomeric bushing 22 encased in and bonded to a thin metal cylinder 23 which is press fitted into bore 21 in a metal to metal fitting.

A U-shaped floating caliper 25 or caliper member straddles the brake disc 9 and has a pair of projecting or depending housing portions 26 and 27 interconnected by a bridging portion 28 to form an integral unitary U-shaped housing. As seen in FIG. 2, the length of the bridging portion 28 is much less than the length of the projecting portions 26 and 27 to thus present extensions of portions 26 and 27 relative to the bridging portion 28. As viewed in FIG. 2, the respective upper ends of housing portions 26 and 27 have aligned bores 30 and 31 slidably receiving guide bolt or pin member 20 while the lower ends of housing portions 26 and 27 have aligned bores 32 and 33 with a bolt or pin member 35 threadedly engaging threaded bore 33 while frictionally passing through bore 36 of elastomeric bushing 22 that is mounted in the leg member 12 of stationary brake support 10.

The housing portion 27 of caliper 25 has a pair of spaced bores 37 and 38 whose axes are normal to the braking planar surface of brake disc 9. A piston 39 is slidably received by each of the bores 37 and 38 with the rear end portion of such piston 39 forming an annular chamber 40 with the walls of the respective bores 37 and 38. Chamber 40 is sealed by the cooperative action of piston 39 and an annular seal 41 located in an annular groove in the respective bores 37 and 38. Each of the bores 37 and 38 are interconnected by a passageway 42, which passageway 42 is connected to an inlet pipe 43 which supplies pressurized fluid to chamber 40 from a suitable source for actuating the pistons 39. The pressurized fluid in chamber 40 is exhausted via passageway 42 via a control valve not shown in a manner old and well known in the art. The outermost ends of pistons 39, which is closest to the brake disc 9, are suitably connected to a backing plate 44, which backing plate 44 has an oblong shaped friction element 45 suitably connected thereto, for frictionally engaging the surface to be braked on brake disc 9. Located on the opposite braking surface of brake disc 9 is a friction element 48 suitably mounted on a backing plate 49 which in turn is secured to the inside wall surface of housing portion 26 of caliper 25. As best seen in FIG. 5 and 3, each backing plate 44 and 49 are narrow oblong in shape, with one end having a recess 51 which receives a portion of the guide bolt 20. As more clearly seen in FIGS. 3 and 4, the other ends of each backing plates 44 and 49 are recessed as at 53 to receive a portion of the bolt 35. Thus the guide bolt 20 and bolt 35 restrict the movement of the caliper 25 in a direction normal to the braking surface of brake disc 9. A variation on this configuration is to eliminate bore 51 and have both ends of backing plate 44 and 49 recessed as at 53 to facilitate ease of removal and replacement. On loosening of bolts 20 and 35 and sliding them sufficiently axially would permit the replacement of plates 44 and 49 along with their respective friction elements 45 and 48. Removal of bolt 20 from the threaded bore and axial movement to clear bore 51 in the backing plates would permit the pivoting of the backing plates about the guide bolt or pin member 35 to provide access to change or repair the brake pads or friction elements 45 and 48 as well as the backing plates 44 and 49 where both backing plates 44 and 49 had recesses 53 on both ends. The constructions described is a material and significant improvement over existing designs of sliding calipers as it utilizes a single sided piston where service of the brake linings is readily accessible and the mounting and hardware used to mount these structure are inexpensive and minimal to effect mounting. In addition this construction is not likely to seize and provides the unique advantage of facilitating the retraction of the piston upon release of the pressurizing fluid.

This latter action is facilitated by the action of the elastomeric bushing 22. When a braking action is effected by the pressurization of chamber 40, piston 39 is moved, as shown in FIG. 5, in a direction to have friction element 45 engage the braking surface of brake disc 9, while simultaneously with this action, the caliper or caliper member 25 is moved in a direction opposite to that of piston 39 as depicted by FIG. 5, which action deforms the elastomeric bushing 22, to move the radial innermost portion to the right while the metal cylinder 23 remains stationary. Upon release of the pressurizing fluid in chamber 40, piston 39 will be retracted rightwardly as viewed in FIG. 5, while the caliper member 25 will move leftwardly. Such action or movement of caliper or caliper member 25 will be aided by the action of the deformed elastomeric bushing 22 returning to its normal position or shape. As lining wear occurs, the bushing 22 is forced to deform more until such time as it overcomes its light press fit over the lower mounting pin or bolt 35. At such time, the elastomeric bushing 22 slips on the bolt 35 and relocates to a new position on the bolt 35. The elastomeric bushing 22 then begins its deformation cycle again until such time as the wear of brake linings 45 and 48 once again slip and permit bushing 22 to relocate thereon.

Various modifications are contemplated and may obviously be resorted to by those skilled in the art without departing from the described invention, as hereinafter defined by the appended claims, as only a preferred embodiment thereof has been disclosed.

We claim:
1. A disc brake assembly comprising a stationary support member having a portion thereof adjacent to a rotor to be braked, a caliper member movably disposed relative to said rotor, a pair of friction elements mounted on said caliper member for frictional engagement with said rotor during braking, a first pin member connected to said support member and operative to movably guide said caliper member relative to said rotor, a second pin member is secured to said caliper member and extending in a direction parallel to said first pin member for movement with caliper member, an elastomeric deformable ring member interconnecting said second pin member to said support member, said ring member fixedly secured to said support member, said ring member slidably and frictionally engaged to said second pin member, and at least one piston member mounted in said caliper member and operative upon actuation to move said friction elements into engagement with said rotor while deforming said ring member in an axial direction between said support member and said second pin member as said caliper member and said second pin members move relative to said support member.

2. A disc brake assembly as set forth in claim 1 wherein said second pin member is secured to spaced portions of said caliper member, and said elastomeric ring member having its exterior surface adhered to a solid ring, and said solid ring being press fitted to said support member.

3. A disc brake assembly as set forth in claim 2 wherein said first and second pin members lie in a vertical plane that is normal to a horizontally extending plane that extends through the axis of rotation of said rotor.

4. A disc brake assembly as set forth in claim 3 wherein each of said friction elements are mounted on backing plates, each backing plate has one end with a bore for slidably receiving said first pin member, and each backing plate has the other end recessed to slidably engage said second pin member.

5. A disc brake assembly as set forth in claim 3 wherein each of said friction elements are mounted on backing plates, each backing plate has recesses on their end portions to slidably engage said first and said second pin members.

6. A disc brake assembly as set forth in claim 4 wherein said support member has laterally spaced extensions that are fixedly connected to said first pin member, and said solid ring connection to said support member is a connection to a third extension of said support member.

7. A floating caliper disc brake assembly for operation on a rotatable brake disc, said brake disc having a pair of spaced friction surfaces, said brake disc rotatable about an axis, a fixed brake support having spaced portions overlying radially outwardly of said brake disc, one of said spaced portions supporting a guide bolt secured thereto and extending in a direction parallel to said axis, the other one of said spaced portion having a bore for receiving an elastomeric bushing, a pin frictionally and slidably received by said bushing for axial movement in a direction parallel to said axis and relative to said other spaced portion of said brake support, a caliper member overlying said brake disc and having one end secured to said pin for movement therewith, said caliper member having the other end journaled on said guide bolt for sliding movement thereon, at least one piston bore in said caliper member having an axis normal to said friction surfaces and parallel to said brake disc axis, piston means slidably journaled in said piston bore and cooperative therewith to form a pressure chamber, a pair of spaced backing plates on opposed sides of said brake disc, one of said backing plates mounted on said piston means, the other one of said backing plates mounted on said caliper member adjacent to said brake disc, brake pads mounted on said backing plates for engagement with said friction surfaces of said brake disc upon pressurization of said pressure chamber, and said elastomeric bushing having its exterior surface secured to said brake support and being operative upon movement of said pin to deform and have its radially innermost surface move with said pin and aid in restoring of said caliper member on termination of said pressurization.

8. A floating caliper disc brake assembly as set forth in claim 7 wherein said other one of said spaced portions of said brake support is an arm member extending inwardly toward said pin, both of said ends of said caliper member have spaced extensions, and said spaced extensions of said one end of said caliper member are secured to said pin and lie on opposite sides of said arm member.

9. A floating caliper disc brake assembly as set forth in claim 8 wherein said elastomeric bushing is mounted in a cylindrical metal ring press fitted into said bore of said other one of said spaced portions of said brake support.

10. A floating caliper disc brake assembly as set forth in claim 9 wherein said one end of said brake support has a pair of arm members spaced outwardly of said spaced extensions of said caliper member to permit said caliper member to reciprocate on said guide bolt that is secured to said arm members a limited extent.

11. A floating caliper disc brake assembly as set forth in claim 10 wherein the axes of said guide bolt and said pin lie in a vertical plane that is normal to a horizontal plane that contains the axis of said brake disc to facilitate the repair of said brake assembly.

* * * * *